United States Patent
Bienn et al.

(10) Patent No.: US 9,949,171 B2
(45) Date of Patent: Apr. 17, 2018

(54) ADVANCED LMSD INTERSYSTEM HANDOFF

(75) Inventors: Marvin Bienn, Dallas, TX (US); Gary Stephens, Richardson, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1593 days.

(21) Appl. No.: 13/278,782

(22) Filed: Oct. 21, 2011

(65) Prior Publication Data
US 2012/0294280 A1    Nov. 22, 2012

Related U.S. Application Data

(60) Provisional application No. 61/488,339, filed on May 20, 2011.

(51) Int. Cl.
  H04W 36/00   (2009.01)
  H04W 36/14   (2009.01)
  H04W 76/04   (2009.01)

(52) U.S. Cl.
  CPC ........ H04W 36/0022 (2013.01); H04W 36/14 (2013.01); H04W 76/041 (2013.01)

(58) Field of Classification Search
  CPC ................................................... H04W 36/00
  USPC ....................................................... 370/331
  See application file for complete search history.

(56) References Cited

U.S. PATENT DOCUMENTS

| | | | | |
|---|---|---|---|---|
| 5,930,713 A * | 7/1999 | Nguyen | ........................ | 455/440 |
| 6,741,695 B1 * | 5/2004 | McConnell et al. | .......... | 379/229 |
| 6,795,444 B1 * | 9/2004 | Vo et al. | ........................ | 370/401 |
| 6,931,249 B2 * | 8/2005 | Fors et al. | ..................... | 455/436 |
| 7,406,324 B1 * | 7/2008 | McConnell | .................... | 455/466 |
| 7,773,581 B2 * | 8/2010 | Punj et al. | ..................... | 370/352 |
| 8,139,541 B2 * | 3/2012 | Ejzak et al. | ..................... | 370/331 |
| 2003/0169768 A1 * | 9/2003 | Bienn et al. | .................. | 370/469 |
| 2004/0203788 A1 * | 10/2004 | Fors et al. | ..................... | 455/439 |
| 2006/0111115 A1 * | 5/2006 | Marin et al. | .................. | 455/442 |
| 2007/0189254 A1 * | 8/2007 | Tariq et al. | .................... | 370/338 |
| 2009/0080382 A1 * | 3/2009 | Chen et al. | .................... | 370/331 |
| 2010/0142488 A1 * | 6/2010 | Zhang et al. | ................. | 370/332 |
| 2011/0159880 A1 * | 6/2011 | Kumar et al. | ................ | 455/450 |

OTHER PUBLICATIONS

3GPP2. $3^{rd}$ Generation Partnership Project 2: Legacy MS Domain Step 2. 3GPP2 X.S0025-0, Version 1.0; Feb. 2006.

* cited by examiner

Primary Examiner — Edan Orgad
Assistant Examiner — Nourali Mansoury

(57) ABSTRACT

An Anchor Mobile Switching Center emulation (MSCe) and a Target MSCe are described herein that take part in an intersystem handoff of a Mobile Station (MS) which is in communication with a B-party. Upon the MS establishing a connection with the Target MSCe, the Anchor MSCe may perform SDP offer/answer exchange between the Target network and the B-Party for the purpose of codec renegotiation to correct a transcoding incompatibility or to enhance the voice bearer path characteristics or to minimize the number of transcodings in the bearer path, between the two parties. The Anchor MSCe and the Target MSCe both support Advanced Legacy Mobile Station Domain (ALMSD) implying that only the SIP transport is used for intersystem handoff communications.

20 Claims, 5 Drawing Sheets

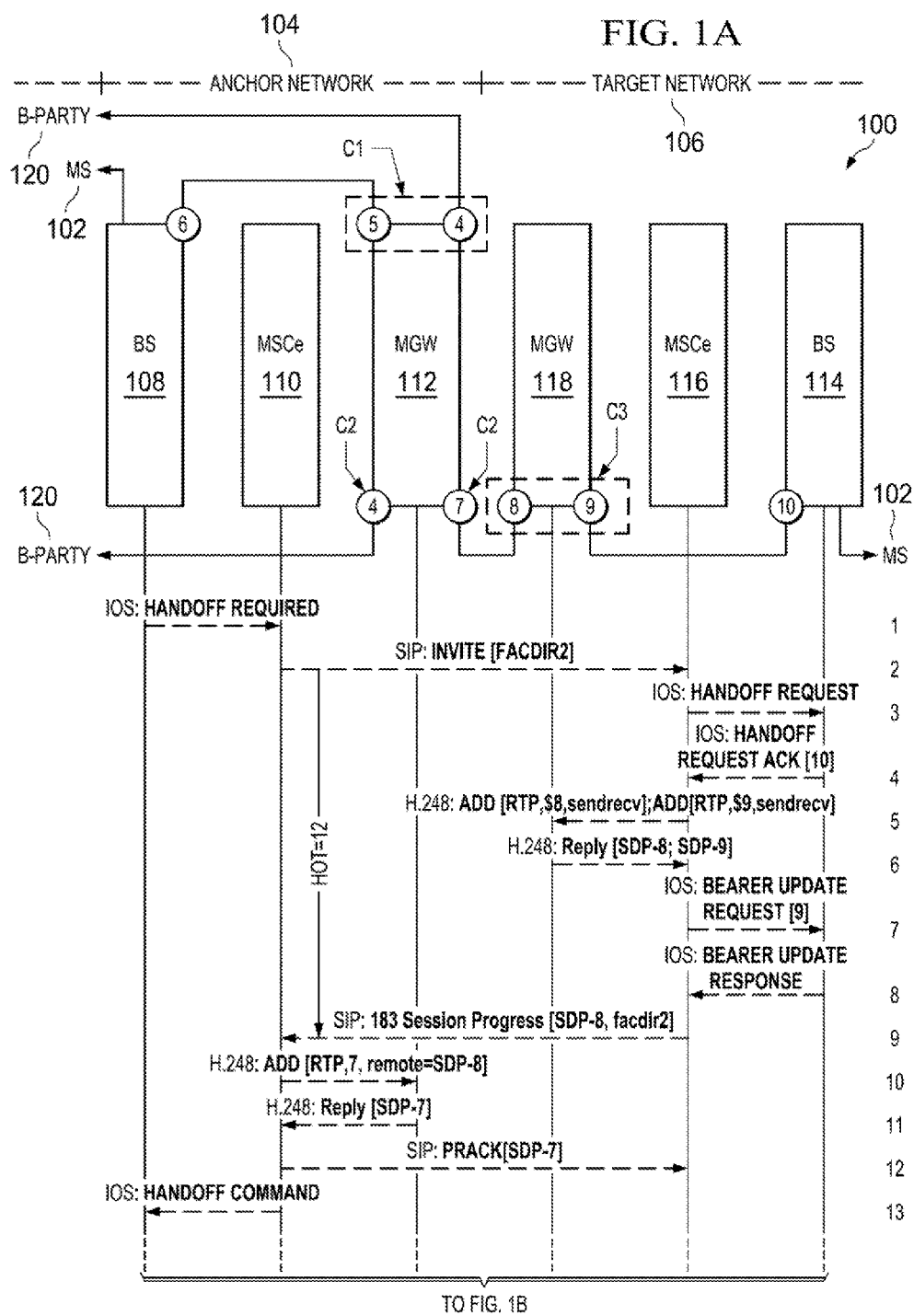

ADVANCED LMSD INTERSYSTEM HANDOFF

CLAIM OF PRIORITY

This application claims the benefit of U.S. Provisional Application Ser. No. 61/488,339 filed on May 20, 2011. The contents of this document are hereby incorporated by reference herein.

TECHNICAL FIELD

The present invention relates to an intersystem handoff between an Anchor MSCe and a Target MSCe of a Mobile Station (MS) in communication with another party that also allows for an SDP offer/answer exchange between the other party and the Target network for the purpose of codec renegotiation after the MS has established a connection with the Target MSCe, to correct a transcoding incompatibility or to enhance the voice bearer path characteristics or to minimize the number of transcodings in the bearer path, between the two parties. The Anchor MSCe and the Target MSCe both support Advanced Legacy Mobile Station Domain (ALMSD) implying that only the SIP transport is used for intersystem handoff communications.

BACKGROUND

The following abbreviations are herewith defined, at least some of which are referred to within the following description about at least the prior art and/or the present invention.
ALMSD Advanced Legacy Mobile Station Domain
BS Base Station
CDMA Code Division Multiple Access
FACDIR2 Facility Directive
IOS Inter-Operability Specification
IP Internet Protocol
LMSD Legacy MS Domain
MGW Media Gateway
MS Mobile Station
MSC Mobile Switching Center
MSCe Mobile Switching Center emulation
PSTN Public Switched Telephone Network
RTP Real-time Transport Protocol
SDP Session Description Protocol
SIP Session Initiation Protocol
SS7 Signaling System 7

CDMA voice services (e.g., call origination or call termination) are supported by establishing a dedicated signaling and bearer connection between a Mobile Station (MS), a Base Station (BS), and a Mobile Switching Center (MSC). The BS controls the air interface resources and the MSC performs call control for the voice services provided to the MS. If the MS is moving the signal strength between the MS and the BS might decrease to a level such that a different BS might be better able (have a higher signal strength) to establish a dedicated signaling and bearer connection to the MS. A handoff, or handover, occurs when the air interface resources supporting an ongoing voice service is transferred from an anchor BS (the BS initiating the handoff) to a target BS (the BS receiving the handoff request). An intra-MSC handoff occurs when both the Anchor BS and the Target BS are served by the same MSC. An inter-MSC handoff occurs when the anchor BS and the target BS are served by different MSCs. During an inter-MSC handoff (also referred to as intersystem hard handoff or intersystem handoff) the MSC initiating the handoff is called the Anchor MSC and the MSC receiving the handoff request is called the Target MSC.

A MSCe (Mobile Switching Center emulation) is a network entity originally defined for Legacy MS Domain (LMSD) support. The MSCe provides signaling capabilities comparable to those of a legacy MSC but has only bearer management capabilities. Some of the MSCe functionality includes:

the establishment, management, and release of voice calls and bearer resources associate with a voice call (for example, the use of Session Initiation Protocol (SIP) signaling for call control and the use of H.248 signaling to control bearer resource allocation);

call modifications for ongoing voice calls (for example, call hold, the addition of a third party to the call, the redirection of the call to a different party); and interworking between the TIA/EIA-41 signaling protocol and the SIP signaling protocols.

For intersystem handoff communications between an Anchor MSCe and a Target MSCe that both support Legacy Mobile Station Domain (LMSD) the TIA/EIA-41 signaling protocol and the SIP signaling protocol are required. For the sake of convenience an intersystem handoff between an Anchor MSCe and a Target MSCe that both support LMSD is referred to herein as an "LMSD handoff". Details of what is required for an MSCe to support LMSD are defined in the LMSD standard entitled "Legacy MS Domain Step 2" Version 1.0, dated February, 2006.

For intersystem handoff communications between an Anchor MSCe and a Target MSCe that both support Advanced Legacy Mobile Station Domain (ALMSD) only the SIP signaling protocol is required. For the sake of convenience an intersystem handoff between an Anchor MSCe and a Target MSCe that both support ALMSD is referred to herein as an "ALMSD handoff". If the Anchor MSCe and a Target MSCe both support ALMSD no Signaling System 7 (SS7) connectivity is required between the two MSCes. Details of what is required for an MSCe to support ALMSD for the purpose of an intersystem handoff, with the Anchor MGW established in the voice bearer path after the intersystem handoff, are given in this invention.

The MSCe controls bearer resources using International Telecommunications Union Telecommunication (ITU-T) Recommendation H.248 signaling to a Media Gateway (MGW). The MGW has the ability to connect to the IP-based core network as well as to the circuit-based Public Switched Telephone Network (PSTN). The MGW may provide vocoding and/or transcoding functions to the bearer traffic. The resources provided by the MGW, including transcoding resources, can be used to support bearer channels that are contained entirely within the IP environment.

Although an LMSD handoff (i.e., as defined in Legacy MS Domain Step 2" Version 1.0, dated February, 2006) works well it still has problems that can occur after a MS has successfully established a connection with the Target BS. These problems are discussed below.

In one problem, a LMSD handoff does not take into consideration the use case (scenario) of the MS successfully establishing a connection with the Target BS yet resulting in the Anchor MGW being unable to support (e.g., due to operator policy, or Anchor MGW inability) transcoding between the codec established for the B-Party to Anchor MGW bearer path and the codec established for the Anchor MGW and the MS connected to the Target BS.

In another problem, a LMSD handoff does not take into consideration the use case (scenario) of the MS successfully establishing a connection with the Target BS yet resulting in the Anchor MGW selecting a less optimal codec (due to for example voice quality, bandwidth, or operator policy) for the voice bearer path.

In yet another problem, the Anchor MSCe limits the Target network choice of codecs for establishing the voice bearer path back to the Anchor network. In the prior art the Anchor network only offered the Target network the pre-handoff active codec. In view of the foregoing, it can be seen that there has been and is a need to address these problems and other problems associated with an existing LMSD handoff.

SUMMARY

An Anchor MSCe, a Target MSCe, and methods which address the aforementioned problems are described in the independent claims of the present application. Advantageous embodiments of the Anchor MSCe, a Target MSCe, and methods have been described in the dependent claims of the present application.

In one aspect, the present invention provides an Anchor MSCe and method implemented thereby for supporting an intersystem handoff of a MS from an Anchor Network to a Target Network, wherein the MS is in communication with a B-Party, wherein the Anchor Network includes an Anchor BS, the Anchor MSCe and an Anchor MGW, and wherein the Target Network includes a Target BS, a Target MSCe and a Target MGW. The Anchor MSCe is configured to send a Handoff Request message to the Target MSGe, wherein the Handoff Request message further includes a SIP INVITE message that contains a TIA/EIA-41 FacilitiesDirective2 INVOKE message (concisely indicated as FACDIR2). In addition, the Anchor MSCe is configured to receive from the Target MSCe a SIP Provisional Response (e.g., a 183 Session Progress) with an embedded TIA/EIA-41 Facilities-Directive2 RETURN RESULT message (concisely indicated as facdir2). Furthermore, the Anchor MSCe is configured to receive from the Target MSCe a SIP 200 OK (INVITE) message indicating the MS has successfully established a connection to the Target BS. Moreover, the Anchor MSCe is configured to determine if the Anchor MGW can support transcoding between a first codec established for a first termination for the voice bearer path to the B-Party and a second codec established for a second termination for the voice bearer path to the Target MGW which will result in a voice bearer that meets or exceeds a pre-established criteria (e.g., a set of voice quality metrics, voice delay value). If the Anchor MGW can support transcoding then the Anchor MSCe sends a H.248 MOVE command to the Anchor MGW instructing the Anchor MGW to connect the first termination to the second termination. If the Anchor MGW cannot support transcoding or if the transcoding will result in a voice bearer that does not meet a pre-established criteria then the Anchor MSCe solicits a Session Description Protocol (SDP) offer/answer exchange between the B-Party, the Anchor MGW and the Target MGW to establish either a common codec between the first termination and second termination of the Anchor MGW or to establish a codec combination for the voice bearer path that does met the pre-established criteria. The advantages are: fewer dropped calls due to an intersystem handoff (e.g., due a reduction in the selection of incompatible codecs) and improved voice bearer characteristics (e.g., due to a reduction is suboptimal codec selections that do not meet a pre-established criteria).

In yet another aspect, the present invention provides a Target MSCe and method implemented thereby for supporting an intersystem handoff of a MS which is in communication with a B-Party from an Anchor Network to a Target Network, wherein the Anchor Network includes an Anchor BS, an Anchor MSCe and an Anchor MGW, and wherein the Target Network includes a Target BS, the Target MSCe and a Target MGW. The Target MSCe is configured to receive a Handoff Request message from the Anchor MSCe, wherein the Handoff Request message further includes a Session Initiation Protocol (SIP) INVITE message that contains a FACDIR2 message. In addition, the Target MSCe is configured to send to the Anchor MSCe a SIP Provisional Response (e.g., a 183 Session Progress) containing a facdir2 message. Furthermore, the Target MSCe is configured to send to the Anchor MSCe a SIP 200 OK (INVITE) message indicating that the MS has successfully established a connection to the Target BS. Moreover, if the Anchor MSCe determines that a SDP offer/answer exchange between the B-Party, the Anchor MGW and the Target MGW is required the Target MSCe is further configured to receive a SIP re-INVITE containing an SDP offer from the Anchor MSCe, to command the Target MGW to modify the first termination of the Target MGW for the voice bearer path to the Anchor MGW based on the SDP offer, to receive a reply from the Target MGW containing a local SDP for the first termination and to send a reliable non-failure SIP response message to the Anchor MSCe containing an SDP answer to the SDP offer. The advantages are: fewer dropped calls due to an intersystem handoff (e.g., due a reduction in the selection of incompatible codecs) and improved voice bearer characteristics (e.g., due to a reduction is suboptimal codec selections that do not meet a pre-established criteria).

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings:

FIGS. 1A-1B is a signal-flow diagram illustrating an exemplary embodiment of the method of the present invention;

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention. Additionally, it should be understood that the invention may be implemented in hardware or in a combination of hardware and software in which one or more processors execute computer program instructions stored on non-transitory memory devices, and thereby cause the various nodes in the Anchor and Target networks to perform the inventive method.

Figure 1B:
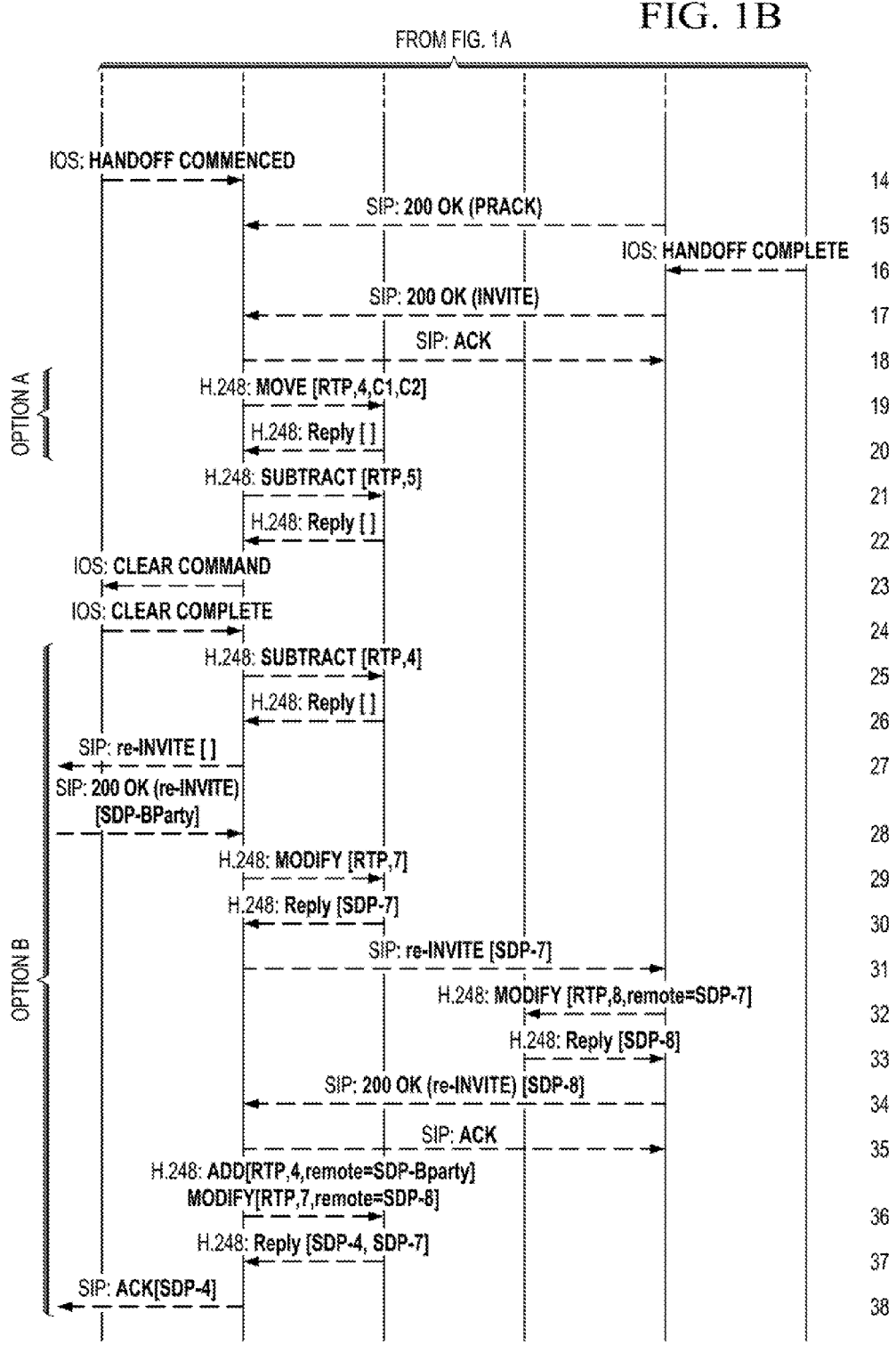

Referring to FIG. 1, there is a signaling diagram illustrating an exemplary embodiment of the method 100 of the present invention. The illustrated scenario shows an inter-system handoff for a MS 102 from an Anchor Network 104 to a Target Network 106. The Anchor Network 104 includes an Anchor BS 108, an Anchor MSCe 110, and an Anchor MGW 112. The Target Network 106 includes a Target BS 114, a Target MSCe 116, and a Target MGW 118. Both the Anchor MSCe 110 and the Target MSCe 116 support Advanced LMSD. The Anchor MSCe is aware that the Target MSCe supports Advanced LMSD (e.g., though configuration information). The signaling diagram assumes that a media exchange is already established between the MS 102 in the Anchor Network 104 and a B-party 120 which may or may not be in another network/system. The term "B-party" is used herein to denote the network entity that communicated with Anchor MSCe 104 to establish a call with MS 102 (e.g., MS 102 could have initiated the call or MS 102 could have been the called party). Examples of a B-Party include a SIP capable MS using VoIP, a Wireline switch acting as a SIP proxy for a PSTN phone or an MSCe supporting another MS. IP connections at the MGWs 112 and 118 and BSs 108 and 114 are illustrated as numbers inside small ovals. The voice bearer path of the initial media exchange is illustrated here in folded fashion using the oval numbers (B-Party)→(4)(5)→(6)→(MS).

The exemplary method 100 has the following steps:

1. A voice call (media exchange) has been established between the MS 102 served in the Anchor Network 104 and the B-Party 120. The voice bearer path is illustrated in folded fashion (B-Party 120)→(termination 4)(termination 5)→(termination 6)→(MS 102). Context1 (C1) is used at the Anchor MGW 112 to connect termination 4 and termination 5. It is determined that an Intersystem Handoff is necessary between the Anchor and Target networks 104 and 106. A Inter-Operability Specifcation (IOS) HANDOFF REQUIRED message is sent from the Anchor BS 108 to the Anchor MSCe 110 containing the list of candidate cells in the domain of Target BS 114.
2. In response to the IOS HANDOFF REQUIRED message, the Anchor MSCe 110 sends an SIP INVITE message to Target MSCe 116. The SIP INVITE message does not contain an SDP offer. The SIP INVITE message contains a FACDIR2 message. The FACDIR2 message contains the list of candidate cells and the identity of Target BS 114 received in the IOS HANDOFF REQUIRED message, the codec the MS 102 is presently using and may also contain other preferred codecs.
3. Upon receiving the SIP INVITE message containing the FACDIR2, the Target MSCe 116 sends a IOS HANDOFF REQUEST to the Target BS 114. In this example, the HANDOFF REQUEST is used to trigger an offer of the BS capabilities at the Target BS 114.
4. The Target BS 114 responds with a IOS HANDOFF REQUEST ACK, and includes the IP address and codec capabilities for the IP termination in the Target BS, indicated by the oval 10.
5. Upon receiving the IOS HANDOFF REQUEST ACK, the Target MSCe 116 sends two International Telecommunications Union Telecommunication (ITU-T) Recommendation H.248 (concisely indicated as H.248) ADD commands to the Target MGW 118 requesting the establishment of two terminations and the establishment of a new Context3 (C3). The first ADD command establishes a first termination (indicated by oval 8) towards the Anchor MGW 112 using real-time transport protocol (RTP), and the second ADD command establishes a second termination (indicated by oval 9) from the Target MGW 118 towards the Target BS 114 also using RTP.
6. The Target MGW 118 responds by sending local SDP information for termination (8) and termination (9) in a H.248 Reply.
7. Upon receiving the H.248 Reply message, the Target MSCe 116 sends a IOS BEARER UPDATE REQUEST message to Target BS 114 with the Target MGW 118 IP address associated with termination (9) and a selected codec.
8. The Target BS 114 responds with a IOS BEARER UPDATE RESPONSE message to Target MSCe 116.
9. Upon receiving the SDP information (step 6), the Target MSCe 116 sends a SIP 183 Session Progress message to Anchor MSCe 110 which includes a SDP offer, containing the IP address and one or more codecs for Target MGW termination 8, and a facdir2 message.
10. Following the receipt of the SIP 183 Session Progress from the Target MSCe 116, the Anchor MSCe 110 sends an H.248 ADD command to the Anchor MGW 112 to establish a new Context2 (C2) with a new termination (7) towards the Target MGW 114 also using RTP. The H.248 ADD command contains the SDP offer that was received in step 9.
11. The Anchor MGW 112 acknowledges the results of the H.248 ADD command with a H.248 Reply containing the local SDP for the Anchor MGW termination 7.
12. The Anchor MSCe 110 sends a SIP Provisional Response Acknowledgement (PRACK) message containing an SDP answer (to the SDP offer received in step 9) to the Target MSCe 116 in response to the SIP 183 Session Progress message.
13. Anytime after receipt of the facdir2 message (step 9), the Anchor MSCe 110 sends a IOS HANDOFF COMMAND to the Anchor BS 108. This triggers the Anchor BS 108 to send a Handoff Direction Message to the MS instructing the MS to establish a connection with the Target BS 114.
14. The Anchor BS 108 sends a IOS HANDOFF COMMENCED to the Anchor MSCe 110 to notify the Anchor MSCe 110 that the MS has been ordered to move to the assigned Target BS 114 channel.
15. The Target MSCe 116 in response to the SIP PRACK message, sends a SIP 200 OK (PRACK) message to the Anchor MSCe 110.
16. The Target BS 114 sends the Target MSCe 116 a IOS HANDOFF COMPLETE message when MS 102 has successfully established a connection with Target BS 114. At this time, a voice bearer channel from MS 102 to Target BS 114 to Target MGW 118 termination 9 has been established.
17. The Target MSCe 116 sends the Anchor MSCe 110 a SIP 200 OK (INVITE) message to indicate that MS 102 has successfully established a connection with Target BS 114.
18. The Anchor MSCe 110 sends an SIP ACK message to the Target MSCe 116 in response to the SIP 200 OK (INVITE) message.

19. If Option A: If the active codec for termination 4 and the active codec for termination 7 are the same or if the Anchor MGW 112 can transcode between the active codec for termination 4 and the active codec for termination 7 resulting in a voice bearer that meets or exceeds a pre-established criteria (e.g., voice quality, transcoding delay) then the Anchor MSCe 110 sends a H.248 MOVE command to the Anchor MGW 112. The H.248 MOVE command connects Context1 (termination 4) to Context2 (termination 7) and if necessary applies transcoding between termination 4 and termination 7.

Note that if the Anchor MSCe does not have a pre-established criteria (e.g., the Anchor MSCe has not been configured with such logic) then if the Anchor MGW 112 can transcode between the active codec for termination 4 and the active codec for termination 7 the pre-established criteria is automatically considered met.

20. If Option A: The Anchor MGW 112 acknowledges the H.248 MOVE command with an H.248 Reply.
21. Anytime after receipt of the SIP 200 OK (INVITE) message (step 17), the Anchor MSCe 110 uses the H.248 SUBTRACT command to remove the termination 5 which was associated with the bearer path to Anchor BS 108.
22. The Anchor MGW 112 acknowledges the H.248 SUBTRACT command with a H.248 Reply.
23. Anytime after receipt of the SIP 200 OK (INVITE) message (step 17), the Anchor MSCe 110 sends an IOS CLEAR COMMAND message to the Anchor BS 108.
24. The Anchor BS 108 responds to the IOS CLEAR COMMAND message by sending an IOS CLEAR COMPLETE message to the Anchor MSCe 110.
25. If Option B: If the Anchor MGW 112 cannot support (e.g., due to operator policy, or Anchor MGW inability) transcoding between the codec established for termination 4 and the codec established at termination 7 then Option B is required to establish a codec combination for the voice bearer path between the B-Party 120 and the MS 102 that meets or exceeds a pre-established criteria or If the Anchor MSCe 110 determines that Anchor MGW 112 transcoding between the active codec for termination 4 and the active codec for termination 7 will result in a voice bearer that does not meet a pre-established criteria (e.g., voice quality, transcoding delay), then Option B is required to establish a codec combination for the voice bearer path between the B-Party 120 and the MS 102 that does meet or exceed the pre-established criteria.

Anytime after receipt of the SIP 200 OK (INVITE) message (step 17), the Anchor MSCe 110 sends a H.248 SUBTRACT command to Anchor MGW 112 to remove termination 4 towards the B-Party.

26. If Option B: The Anchor MGW 112 acknowledges the H.248 SUBTRACT command with an H.248 Reply.
27. If Option B: Anchor MSCe 110 sends a SIP re-INVITE message to the B-Party 120 to solicit an SDP offer from the B-Party. The SIP re-INVITE message does not contain an SDP offer.
28. If Option B: In response to SIP re-INVITE message (step 27) the Anchor MSCe 110 receives a reliable non-failure SIP Response message (e.g., a 200 OK (re-INVITE) message) from the B-Party 120 containing an SDP offer.
29. If Option B: The Anchor MSCe 110 updates the bearer information at the Anchor MGW 112. A H.248 MODIFY command solicits an SDP offer for the Anchor MGW termination (7). The local descriptor for the H.248 MODIFY command is based on the codec list obtained from SDP offer obtained from the B-Party 120 (step 28).
30. If Option B: The Anchor MGW 112 acknowledges the results of the H.248 MODIFY command with a H.248 Reply that contains a local SDP descriptor (SDP-7) for Anchor MGW termination (7). Note that the codecs listed in SDP-7 imply that the Anchor MGW 112 supports common codecs with those listed in SDP-BParty or the Anchor MGW 112 supports transcoding capabilities to trancode between the codecs in SDP-7 and codecs listed in SDP-BParty.
31. If Option B: The Anchor MSCe 110 sends a SIP re-INVITE message to the Target MSCe 116. The SIP re-INVITE message contains a SDP offer.
32. If Option B: Following the receipt of the SIP re-INVITE message from the Anchor Network 104, the Target MSCe 116 updates the bearer information at Target MGW 118. A H.248 MODIFY command updates the Target MGW termination (8) based on the SDP offer received in step 31.
33. If Option B: The Target MGW 118 acknowledges the results of the H.248 MODIFY command with a H.248 Reply that contains a local SDP descriptor (SDP-8) for Target MGW termination (8).

Note that the codecs listed in SDP-8 imply that the Target MGW 118 supports common codecs with those listed in SDP-7 or the Target MGW 118 supports transcoding capabilities to trancode between the codecs in SDP-7 and codecs listed in SDP-8. This also implies that a voice bearer path can be established between the B-Party and MS 120.

34. If Option B: The Target MSCe 116 sends the Anchor MSCe 110 a reliable non-failure SIP Response message (e.g., a 200 OK (re-INVITE) message). The 200 OK (re-INVITE) contains an SDP answer to the SDP offer (step 31).
35. If Option B: The Anchor MSCe 110 sends an SIP ACK message to the Target MSCe 116 in response to the SIP 200 OK (re-INVITE) message.
36. The Anchor MSCe 110 sends an H.248 ADD command and a H.248 MODIFY command to the Anchor MGW 112. The H.248 ADD command adds Anchor MGW 112 termination 4 towards the B-Party 120 and places termination 4 into Context2 (C2). The H.248 MODIFY command updates the Anchor MGW termination (7) based on the SDP answer (step 34).
37. The Anchor MGW 112 acknowledges the results of the H.248 ADD command with an H.248 Reply containing the local SDP for Anchor MGW termination 4. In addition, the Anchor MGW 112 acknowledges the results of the H.248 MODIFY command with a H.248 Reply containing the local SDP for Anchor MGW termination 7.
38. The Anchor MSCe 110 sends an SIP ACK message to the B-Party 120 in response to the SIP 200 OK (re-INVITE) message received in step 28. The SIP ACK message contains an SDP answer to the SDP offer (step 28).

The skilled person in view of the foregoing will appreciate that the signal flow diagram 100 differs from the prior art in many different ways several of which are discussed below:

1. The initial request for the intersystem handoff (step 2) does not contain a SDP offer. Instead the SIP INVITE is used to solicit an SDP offer from the Target MSCe 116. This allows the Target Network 106 to offer (step 9) a full list of codecs that can be supported for the handoff allowing the Anchor MSCe 116 to choose the best (based on operator policy and/or voice quality) codec.

2. The Target MSCe 116 upon receiving a SIP INVITE containing a FACDIR2 (step 2) is aware of what voice service and codec MS 102 is presently using from the information contained within the FACDIR2. The Target MSCe 116 uses the information within the FACDIR2 to help create the SDP offer and determine it a voice bearer path can be supported between the Target BS 114 and the Target MGW 118. The Target MSCe 116 sends back an SDP offer in a SIP Provisional Response (e.g., a SIP 183 Session Progress (step 9)) instead of a SIP 200 OK (INVITE) to Anchor MSCe 110.

3. A SIP 200 OK (INVITE) (step 17) is used to inform the Anchor MSCe 110 that the MS 102 has successfully established a connection with Target BS 114. The TIA/EIA-41 MobileOnChannel (MSONCH) INVOKE message is no longer required.

4. To account for the scenario (use case) in which MS 102 has successfully connected with the Target BS 114 and the Anchor MGW 112 cannot support (e.g., due to operator policy, or Anchor MGW inability) transcoding between the codec established for termination 4 and the codec established at termination 7 then Option B, steps 25-38, is used to establish a codec combination for the voice bearer path between the B-Party 120 and the MS 102 that meets or exceeds a pre-established criteria.

5. To account for the scenario (use case) in which MS 102 has successfully connected with the Target BS 114 and Anchor MSCe 110 determines that Anchor MGW 112 transcoding between the active codec for termination 4 and the active codec for termination 7 will result in a voice bearer that does not meet a pre-established criteria (e.g., voice quality, transcoding delay, operator policy), then Option B, steps 25-38, is used to establish a codec combination for the voice bearer path between the B-Party 120 and the MS 102 that meets or exceeds the pre-established criteria.

Figure 2:
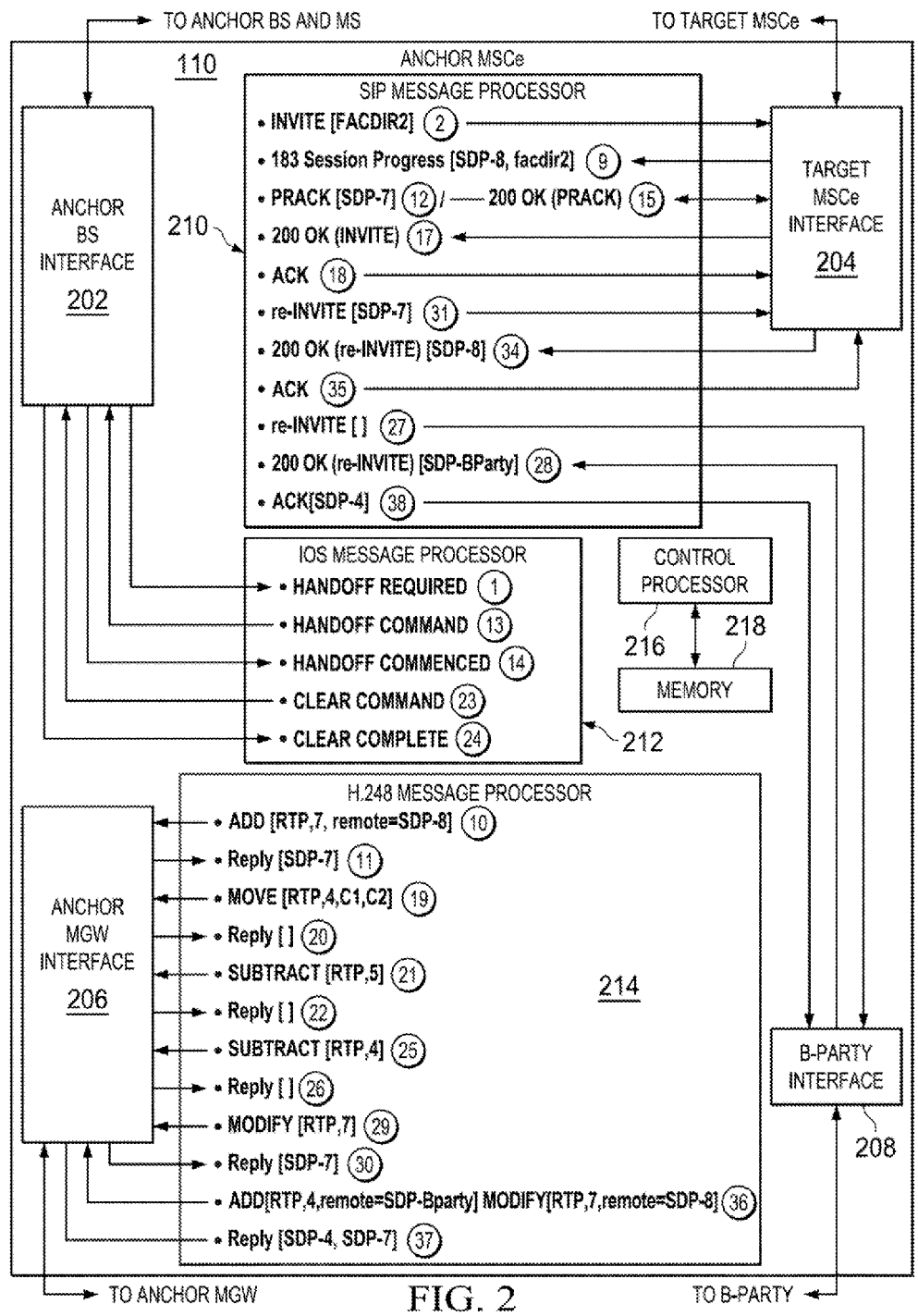
FIG. 2 is a simplified block diagram of an Anchor MSCe in an exemplary embodiment of the present invention.

Referring to FIG. 2, there is a simplified block diagram of the Anchor MSCe 110 in an exemplary embodiment of the present invention. In this embodiment, the Anchor MSCe 110 includes an Anchor BS Interface 202, a Target MSCe Interface 204, an Anchor MGW Interface 206, and a B-Party Interface 208. The Anchor MSCe 110 also includes a SIP Message Processor 210, an IOS Message Processor 212, and an H.248 Message Processor 214. It should be understood that the Anchor MSCe 110 may be implemented in hardware or in a combination of hardware and software in which one or more processors, such as Control Processor 216, execute computer program instructions stored on non-transitory memory devices, such as Memory 218. The Control Processor 216 causes the components of the Anchor MSCe 110 to prepare, send, receive, and respond to the various messages while performing the method 100 of FIG. 1.

Figure 3:
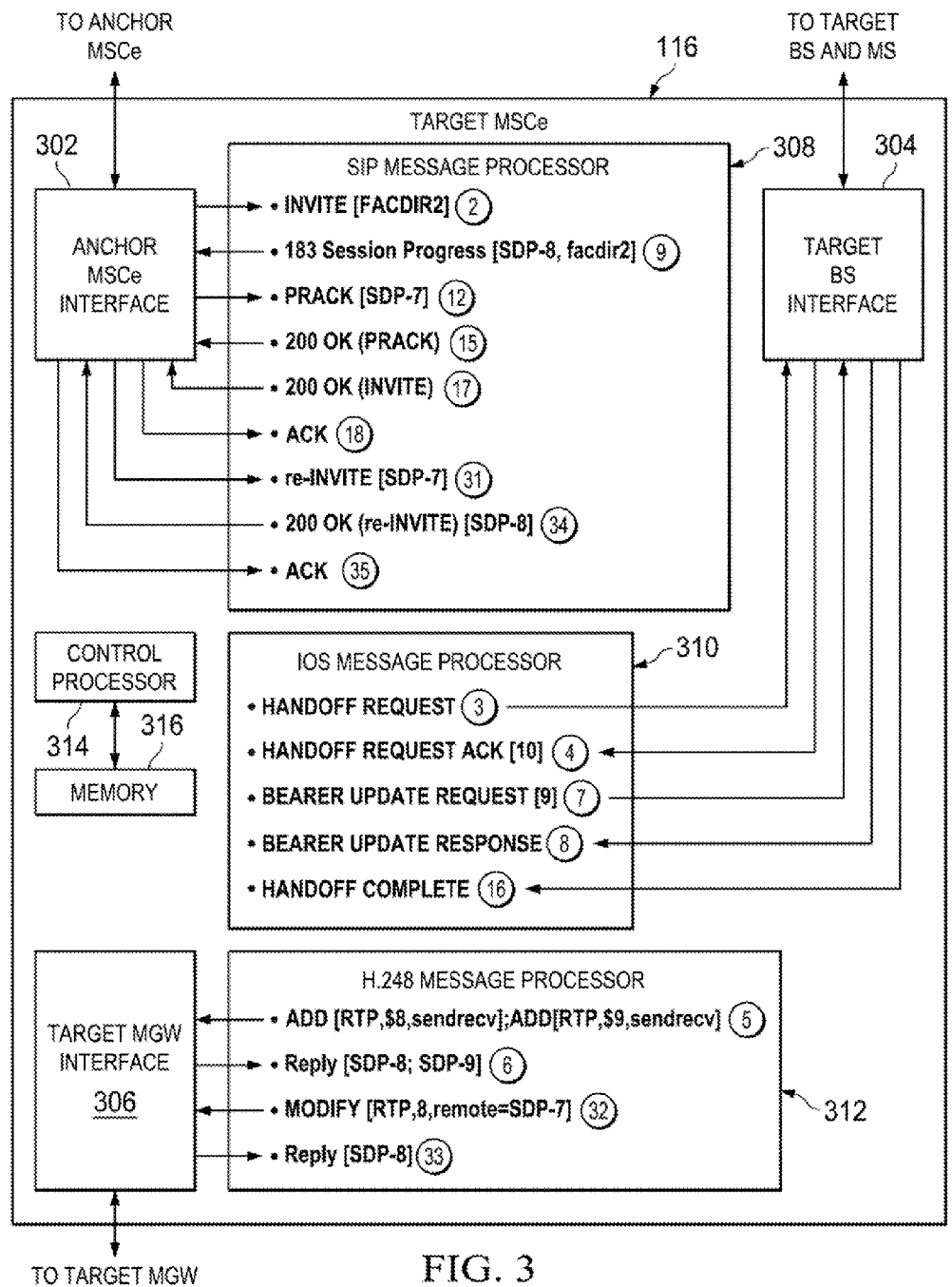
FIG. 3 is a simplified block diagram of a Target MSCe in an exemplary embodiment of the present invention.

Referring to FIG. 3, there is a simplified block diagram of the Target MSCe 116 in an exemplary embodiment of the present invention. In this embodiment, the Target MSCe 116 includes an Anchor MSCe Interface 302, a Target BS Interface 304, and a Target MGW Interface 306. The Target MSCe 116 also includes a SIP Message Processor 308, an IOS Message Processor 310, and an H.248 Message Processor 312. It should be understood that the Target MSCe 116 may be implemented in hardware or in a combination of hardware and software in which one or more processors, such as Control Processor 314, execute computer program instructions stored on non-transitory memory devices, such as Memory 316. The Control Processor 314 causes the components of the Target MSCe 116 to prepare, send, receive, and respond to the various messages while performing the method 100 of FIG. 1.

Figure 4:
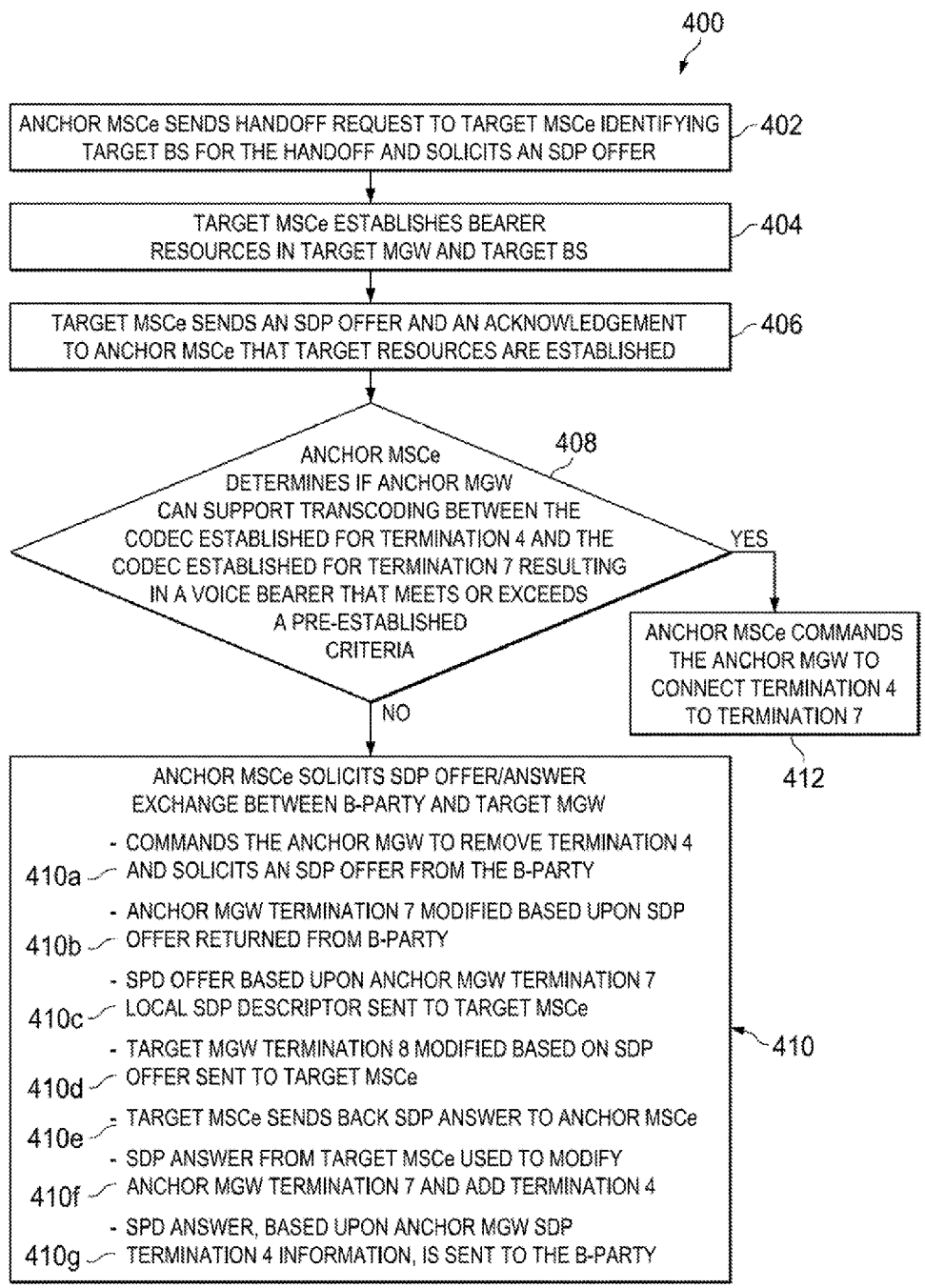
FIG. 4 is a flow chart of an exemplary embodiment of the method of the present invention.

Referring to FIG. 4, there is a flow chart of an exemplary embodiment of the method 400 of the present invention. At step 402, the Anchor MSCe 110 sends a Handoff Request to the Target MSCe 116 identifying the Target BS 114 for the handoff of the MS 120 and solicits an SDP offer (see step 2 in FIG. 1). At step 404, the Target MSCe 116 establishes bearer resources in the Target MGW 118 and the Target BS 114 (see steps 3-8 in FIG. 1). At step 406, the Target MSCe 116 sends an SDP offer and an acknowledgment to the Anchor MSCe 110 that target resources are established (see step 9 in FIG. 1). At step 408, the Anchor MSCe 110 determines if the Anchor MGW 112 can support transcoding between the codec established for termination 4 to the B-party 120 and the codec established for termination 7 to Target MGW 118, resulting in a voice bearer that meets or exceeds a pre-established criteria (see step 19 in FIG. 1). If the result of the Anchor MSCe determination in step 408 is no then step 410 is performed, if the determination in step 408 is yes then step 412 is performed. At step 410, the Anchor MSCe 110 solicits an SDP offer/answer exchange between the B-Party 120 and the Target MGW 118 (see Option B, steps 25-38 in FIG. 1). In one example, the Anchor MSCe 110 solicits an SDP offer/answer exchange between the B-Party 120 and the Target MGW 118 by performing steps 410a, 410b, 410c, 410d, 410e, 410f and 410g. At step 410a, the Anchor MSCe 110 commands the Anchor MGW to remove termination 4 (see steps 25-26 in FIG. 1) and solicits an SDP offer from the B-Party 120 (see steps 27-28 in FIG. 1). At step 410b, the Anchor MGW 112's termination 7 is modified based on SDP offer returned from B-Party 120 (see steps 29-30 in FIG. 1). At step 410c, an SDP offer based on Anchor MGW 112's termination 7 local SDP descriptor is sent to Target MSCe 116 (see step 31 in FIG. 1). At step 410d, the Target MGW's 118 termination 8 to Anchor MGW 112 is modified based on the SDP offer sent to Target MSCe 116 (see steps 32-33 in FIG. 1). At step 410e, the Target MSCe 116 sends back an SDP answer to Anchor MSCe 110 (see step 34 in FIG. 1). At step 410f, the Anchor MSCe 110 uses the SDP answer from Target MSCe 116 to modify the Anchor MGW's 112 termination 7 and the Anchor MSCe 100 adds the Anchor MGW's termination 4 (see steps 36-37 in FIG. 1). At step 410g, the Anchor MSCe 110 sends a SDP answer, based on the Anchor MGW's 112 SDP termination 4 information, to the B-Party 120 (see step 38 in FIG. 1). It should be noted that SDP offer/answer exchange between the B-Party and the Target MGW results in establishing a first codec for the first termination to the B-Party and a second codec for the second termination to the Target MGW which will result in a voice bearer that meets or exceeds the pre-established criteria. Note: the SDP offer/answer exchange may result in a situation where one of the codecs, that is the first codec or second codec does not change. At step 412, the Anchor MSCe 110 commands the Anchor MGW 112 to connect termination 4 to termination 7 (see Option A, steps 19-20 in FIG. 1).

In view of the foregoing there is described an Anchor MSCe 110 configured for supporting an intersystem handoff of a MS 102 which is in communication with a B-Party 120 from an Anchor Network 104 to a Target Network 106. The Anchor Network 104 includes an Anchor BS 108, the Anchor MSCe 110 and an Anchor MGW 112. The Target Network 106 includes a Target BS 114, a Target MSCe 116 and a Target MGW 118. The Anchor MSCe 110 comprises a Target MSCe message interface 204 configured to send a Handoff Request message to the Target MSCe 116, wherein the Handoff Request message further includes a Session Initiation Protocol (SIP) INVITE message that contains a TIA/EIA-41 FacilitiesDirective2 INVOKE message (step 2 in FIG. 1). The Target MSCe message interface 204 is further configured to receive from the Target MSCe 116 a SIP Provisional Response which contains a TIA/EIA-41 FacilitiesDirective2 RETURN RESULT message (step 9 in FIG. 1). The Target MSCe message interface 204 is further configured to receive from the Target MSCe 116 a SIP 200 OK (INVITE) message indicating that the MS 102 has established a connection with the Target BS 114 (step 17 in FIG. 1). The Anchor MSCe 110 is configured to evaluate if the Anchor MGW 112 can support transcoding between a first codec established for a first termination 4 to the B-Party 120 and a second codec established for a second termination 7 to the Target MGW 118 which will result in a voice bearer that meets or exceeds a pre-established criteria. If yes, then the Anchor MSCe 110 instructs the Anchor MGW 112 to connect the first termination 4 to the second termination 7 (step 19 in FIG. 1). If no, then the Anchor MSCe 110 solicits an SDP offer/answer exchange between the B-Party 120 and the Target MGW 118 to establish a first codec for the first termination 4 to the B-Party 120 and a second codec for the second termination 7 to the Target MGW 118 which will result in a voice bearer that meets or exceeds the pre-established criteria (Option B, steps 25-38 in FIG. 1). The Anchor MSCe 110 solicits an SDP offer/answer exchange between the B-Party 120 and the Target MGW 118 by: (a) commanding the Anchor MGW 118 to remove termination 4 (step 25-26 in FIG. 1) and sending a SIP re-INVITE which does not contain a SDP offer to the B-Party 120 (step 27 in FIG. 1); (b) receiving a reliable non-failure SIP response message which contains a SDP offer from the B-Party 120 (step 28 in FIG. 1); (c) sending a command to the Anchor MGW 112 to modify the second termination 7 to the Target MGW 118 based on a codec list in the SDP offer obtained from the B-Party 120 (step 29 in FIG. 1); (d) receiving a reply from the Anchor MGW 118 that contains a local SDP including a list of codecs that are in common with codecs in the codec list in the SDP offer obtained from the B-Party 120 and a list of codecs for which the Anchor MGW 118 can transcode based on the codec list in the SDP offer obtained from the B-Party 120 (step 30 in FIG. 1); (e) sending a SIP re-INVITE to the Target MSCe 116 which contains a SDP offer based upon the local SDP of the second termination 7 from the Anchor MGW 112 to the Target MGW 118 (step 31); (f) receiving a reliable non-failure SIP response message from the Target MSCe 116 where the reliable non-failure SIP response message contains an SDP answer to the SDP offer (step 34 in FIG. 1); (g) sending a command to the Anchor MGW 112 to modify the second termination 7 to the Target MGW 118 based on the SDP answer obtained from the Target MSCe 116 (step 36 in FIG. 1); (h) sending a command to the Anchor MGW 112 to add the first termination 4 to the B-Party 120 based the SDP Offer received from the B-Party 120 (step 36 in FIG. 1); (i) receiving a reply from the Anchor MGW 112 that contains a local SDP for the first termination 4 to the B-Party 120 including a list of codecs that are in common with the codec list in the SDP offer obtained from the B-Party 120 and a list codecs for which the Anchor MGW 112 can transcode based on the codec list in the SDP offer obtained from the B-Party 120; (j) receiving a reply from the Anchor MGW 112 where the reply contains a local SDP for the second termination 7 to the Target MGW 118 which includes a list of codecs that are in common with the codec list in the SDP answer obtained from the Target MSCe 116 and a list codecs for which the Anchor MGW 112 can transcode based on the codec list in the SDP answer obtained from the Target MSCe 116; and (k) sending to the B-Party 120 a SIP Response containing an SDP answer based upon the local SDP of the first termination 4 to the B-Party 120 (see step 38 in FIG. 1).

In view of the foregoing there is described a Target MSCe 116 configured to supporting an intersystem handoff of a MS 102 which is in communication with a B-Party 120 from an Anchor Network 104 to a Target Network 106. The Anchor Network 104 includes an Anchor BS 108, an Anchor MSCe 110 and an Anchor MGW 112. The Target Network 106 includes a Target BS 114, the Target MSCe 116 and a Target MGW 118. The Target MSCe 116 comprises an Anchor MSCe message interface 302 configured to receive a Handoff Request message from the Anchor MSCe 110, wherein the Handoff Request message further includes a Session Initiation Protocol (SIP) INVITE message that contains a TIA/EIA-41 FacilitiesDirective2 INVOKE message (step 2 in FIG. 1). The Anchor MSCe message interface 302 is further configured to send to the Anchor MSCe 110 a SIP Provisional Response which contains a TIA/EIA-41 FacilitiesDirective2 RETURN RESULT message (step 9 in FIG. 1). The Target MSCe 116 is configured to establish bearer resources in the Target MGW 118 and the Target BS 114 (steps 3-8 in FIG. 1). The Anchor MSCe message interface 302 is further configured to send to the Anchor MSCe 110 a SIP 200 OK (INVITE) message indicating that the MS 102 has established a connection with the Target BS 114 (step 17 in FIG. 1). The Anchor MSCe message interface 302 is further configured to receive a SIP re-INVITE from the Anchor MSCe containing an SDP offer (step 31 in FIG. 1). The Target MSCe 116 is further configured to send a command to the Target MGW 118 to modify the first termination to the Anchor MGW based on the codec list in the SDP offer (step 32 in FIG. 1). The Target MSCe 116 is further configured to receive a reply from the Target MGW 118 that contains a local SDP including a list of codecs that are in common with codecs in the codec list in the SDP offer and a list of codecs for which the Target MGW can transcode based on the codec list in the SDP offer (step 33 in FIG. 1). The Anchor MSCe message interface 302 is further configured to send a reliable non-failure SIP response message to the Anchor MSCe 110 where the reliable non-failure SIP response message contains a SDP answer to the SDP offer (step 34 in FIG. 1).

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

The invention claimed is:

1. An Anchor Mobile Switching Center emulation (MSCe) for supporting an intersystem handoff of a Mobile Station (MS) from an Anchor Network to a Target Network, wherein the MS is in communication with a B-Party, wherein the Anchor Network comprises an Anchor Base Station (BS), the Anchor MSCe and an Anchor Media Gateway (MGW), and wherein the Target Network comprises a Target BS, a Target MSCe and a Target MGW, the Anchor MSCe comprising:

a Target MSCe message interface configured to send a Handoff Request message to the Target MSCe, wherein the Handoff Request message comprises a Session Initiation Protocol (SIP) INVITE message that contains a TIA/EIA-41 FacilitiesDirective2 INVOKE message;

the Target MSCe message interface is further configured to receive from the Target MSCe a SIP Provisional Response which contains a TIA/EIA-41 FacilitiesDirective2 RETURN RESULT message;

the Target MSCe message interface is further configured to receive from the Target MSCe a SIP 200 OK (INVITE) message indicating that the MS has established a connection with the Target BS, wherein the SIP 200 OK (INVITE) message is received after receipt of the SIP Provisional Response;

the Anchor MSCe is configured to evaluate whether the Anchor MGW supports transcoding between a first codec established for a first termination to the B-Party and a second codec established for a second termination to the Target MGW which will result in a voice bearer that meets or exceeds a pre-established criteria:

based on a positive evaluation, the Anchor MSCe instructs the Anchor MGW to connect the first termination to the second termination; and based on a negative evaluation, the Anchor MSCe solicits a Session Description Protocol (SDP) offer/answer exchange between the B-Party and the Target MGW to establish a codec combination for a voice bearer path between the B-Party and the MS that meets or exceeds the pre-established criteria.

2. The Anchor MSCe of claim 1, wherein the SDP offer/answer exchange comprises:

sending a command to the Anchor MGW to remove the first termination to the B-Party; and sending a SIP re-INVITE which does not contain a SDP offer to the B-Party; and receiving a reliable non-failure SIP response message which contains a SDP offer from the B-Party.

3. The Anchor MSCe of claim 2, wherein the SDP offer/answer exchange further comprises:

sending a command to the Anchor MGW to modify the second termination to the Target MGW based on a codec list in the SDP offer obtained from the B-Party; and receiving a reply from the Anchor MGW that contains a local SDP including a list of codecs that are in common with codecs in the codec list in the SDP offer obtained from the B-Party and a list of codecs for which the Anchor MGW can transcode based on the codec list in the SDP offer obtained from the B-Party.

4. The Anchor MSCe of claim 3, wherein the SDP offer/answer exchange further comprises:

sending a SIP re-INVITE to the Target MSCe where the SIP re-INVITE contains a SDP offer based upon the local SDP of the second termination from the Anchor MGW to the Target MGW; and receiving a reliable non-failure SIP response message from the Target MSCe where the reliable non-failure SIP response message contains an SDP answer to the SDP offer.

5. The Anchor MSCe of claim 4, wherein the SDP offer/answer exchange further comprises:

sending a command to the Anchor MGW to modify the second termination to the Target MGW based on the SDP answer obtained from the Target MSCe;

sending a command to the Anchor MGW to add the first termination to the B-Party based on the SDP offer received from the B-Party;

receiving a reply from the Anchor MGW that contains a local SDP for the first termination to the B-Party including a list of codecs that are in common with the codec list in the SDP offer obtained from the B-Party and a list codecs for which the Anchor MGW can transcode based on the codec list in the SDP offer obtained from the B-Party;

receiving a reply from the Anchor MGW where the reply contains a local SDP for the second termination to the Target MGW which has a list of codecs that are in common with the codec list in the SDP answer obtained from the Target MSCe and a list of codecs for which the Anchor MGW can transcode based on the codec list in the SDP answer obtained from the Target MSCe; and sending to the B-Party a SIP Response containing an SDP answer based on the local SDP of the first termination to the B-Party.

6. The Anchor MSCe of claim 1, wherein the Session Initiation Protocol (SIP) INVITE message does not contain a Session Description Protocol (SDP), and wherein the TIA/EIA-41 FacilitiesDirective2 INVOKE message comprises a list of candidate cells, an identity of the Target BS, and a codec the MS is presently using.

7. The Anchor MSCe of claim 1, wherein the SIP Provisional Response further comprises (1) a SDP offer and (2) a full list of codecs that can be supported by the target MGW for the intersystem handoff of the MS.

8. A method implemented by an Anchor Mobile Switching Center emulation (MSCe) for supporting an intersystem handoff of a Mobile Station (MS) from an Anchor Network to a Target Network, wherein the MS is in communication with a B-Party, wherein the Anchor Network comprises an Anchor Base Station (BS), the Anchor MSCe and an Anchor Media Gateway (MGW), and wherein the Target Network comprises a Target BS, a Target MSCe and a Target MGW, the method comprising the steps of:

sending a Handoff Request message to the Target MSCe, wherein the Handoff Request message comprises a Session Initiation Protocol (SIP) INVITE message that contains a TIA/EIA-41 FacilitiesDirective2 INVOKE message;

receiving from the Target MSCe a SIP Provisional Response which contains a TIA/EIA-41 FacilitiesDirective2 RETURN RESULT message;

receiving from the Target MSCe a SIP 200 OK (INVITE) message indicating that the MS has established a connection with the Target BS, wherein the SIP 200 OK (INVITE) message is received after receipt of the SIP Provisional Response;

evaluating whether the Anchor MGW supports transcoding between a first codec established for a first termination to the B-Party and a second codec established for a second termination to the Target MGW which will result in a voice bearer that meets or exceeds a pre-established criteria:

based on a positive evaluation, instructing the Anchor MGW to connect the first termination to the second termination; and based on a negative evaluation, soliciting a Session Description Protocol (SDP) offer/answer exchange between the B-Party and the Target MGW to establish a codec combination for a voice bearer path between the B-Party and the MS that meets or exceeds the pre-established criteria.

9. The method of claim 8, wherein the SDP offer/answer exchange comprises:
   sending a command to the Anchor MGW to remove the first termination to the B-Party;
   sending a SIP re-INVITE which does not contain a SDP offer to the B-Party; and
   receiving a reliable non-failure SIP response message which contains a SDP offer from the B-Party.

10. The method of claim 9, wherein the SDP offer/answer exchange further comprises:
    sending a command to the Anchor MGW to modify the second termination to the Target MGW based on a codec list in the SDP offer obtained from the B-Party; and
    receiving a reply from the Anchor MGW that contains a local SDP including a list of codecs that are in common with codecs in the codec list in the SDP offer obtained from the B-Party and a list of codecs for which the Anchor MGW can transcode based on the codec list in the SDP offer obtained from the B-Party.

11. The method of claim 10, wherein the SDP offer/answer exchange further comprises:
    sending a SIP re-INVITE to the Target MSCe which contains a SDP offer based upon the local SDP of the second termination from the Anchor MGW to the Target MGW; and
    receiving a reliable non-failure SIP response message from the Target MSCe where the reliable non-failure SIP response message contains an SDP answer to the SDP offer.

12. The method of claim 11, wherein the SDP offer/answer exchange further comprises:
    sending a command to the Anchor MGW to modify the second termination to the Target MGW based on the SDP answer obtained from the Target MSCe;
    sending a command to the Anchor MGW to add the first termination to the B-Party based the SDP Offer received from the B-Party;
    receiving a reply from the Anchor MGW that contains a local SDP for the first termination to the B-Party including a list of codecs that are in common with the codec list in the SDP offer obtained from the B-Party and a list codecs for which the Anchor MGW can transcode based on the codec list in the SDP offer obtained from the B-Party;
    receiving a reply from the Anchor MGW where the reply contains the local SDP for the second termination to the Target MGW including a list of codecs that are in common with the codec list in the SDP answer obtained from the Target MSCe and a list codecs for which the Anchor MGW can transcode based on the codec list in the SDP answer obtained from the Target MSCe; and
    sending to the B-Party a SIP Response containing an SDP answer based upon the local SDP of the first termination to the B-Party.

13. The method of claim 8, wherein the Session Initiation Protocol (SIP) INVITE message does not contain a Session Description Protocol (SDP), and wherein the TIA/EIA-41 FacilitiesDirective2 INVOKE message comprises a list of candidate cells, an identity of the Target BS, and a codec the MS is presently using.

14. The method of claim 8, wherein the SIP Provisional Response further comprises (1) a SDP offer and (2) a full list of codecs that can be supported by the target MGW for the intersystem handoff of the MS.

15. A Target Mobile Switching Center emulation (MSCe) for supporting an intersystem handoff of a Mobile Station (MS) from an Anchor Network to a Target Network, wherein the MS is in communication with a B-Party, wherein the Anchor Network comprises an Anchor Base Station (BS), an Anchor MSCe and an Anchor Media Gateway (MGW), and wherein the Target Network comprises a Target BS, the Target MSCe and a Target MGW, the Target MSCEe comprising:
    an Anchor MSCe message interface configured to receive a Handoff Request message from the Anchor MSCe, wherein the Handoff Request message comprises a Session Initiation Protocol (SIP) INVITE message that contains a TIA/EIA-41 FacilitiesDirective2 INVOKE message;
    the Anchor MSCe message interface is further configured to send to the Anchor MSCe a SIP Provisional Response which contains a TIA/EIA-41 FacilitiesDirective2 RETURN RESULT message;
    the Target MSCe is configured to establish bearer resources in the Target MGW and the Target BS;
    the Anchor MSCe message interface is further configured to send to the Anchor MSCe a SIP 200 OK (INVITE) message indicating that the MS has established a connection with the Target BS, wherein the SIP 200 OK (INVITE) message is sent after the SIP Provisional Response is sent
    the Target MSCe is further configured to:
    receive a SIP re-INVITE from the Anchor MSCe where the SIP re-INVITE contains an SDP offer;
    send a command to the Target MGW to modify a first termination to the Anchor MGW based on a codec list in the SDP offer;
    receive a reply from the Target MGW where the reply contains a local SDP including a list of codecs that are in common with codecs in the codec list in the SDP offer and a list of codecs for which the Target MGW can transcode based on the codec list in the SDP offer; and
    send a reliable non-failure SIP response message to the Anchor MSCe where the reliable non-failure SIP response message contains a SDP answer to the SDP offer.

16. The Target MSCe of claim 15, wherein the Session Initiation Protocol (SIP) INVITE message does not contain a Session Description Protocol (SDP), and wherein the TIA/EIA-41 FacilitiesDirective2 INVOKE message comprises a list of candidate cells, an identity of the Target BS, and a codec the MS is presently using.

17. The Target MSCe of claim 15, wherein the SIP Provisional Response further comprises (1) a SDP offer and (2) a full list of codecs that can be supported by the target MGW for the intersystem handoff of the MS.

18. A method implemented by a Target Mobile Switching Center emulation (MSCe) for supporting an intersystem handoff of a Mobile Station (MS) from an Anchor Network to a Target Network, wherein the MS is in communication with a B-Party, wherein the Anchor Network comprises an Anchor Base Station (BS), an Anchor MSCe and an Anchor Media Gateway (MGW), and wherein the Target Network comprises a Target BS, the Target MSCe and a Target MGW, the method comprising the steps of:
    receiving a Handoff Request message from the Anchor MSCe, wherein the Handoff Request message comprises a Session Initiation Protocol (SIP) INVITE message that contains a TIA/EIA-41 FacilitiesDirective2 INVOKE message;

sending to the Anchor MSCe a SIP Provisional Response which contains a TIA/EIA-41 FacilitiesDirective2 RETURN RESULT message;

establishing bearer resources in the Target MGW and the Target BS;

sending to the Anchor MSCe a SIP 200 OK (INVITE) message indicating that the MS has established a connection with the Target BS, wherein the SIP 200 OK (INVITE) message is sent after the SIP Provisional Response is sent;

receiving a SIP re-INVITE from the Anchor MSCe where the SIP re-INVITE contains an SDP offer; and sending a command to the Target MGW to modify a first termination to the Anchor MGW based on a codec list in the SDP offer;

receiving a reply from the Target MGW where the reply contains a local SDP including a list of codecs that are in common with codecs in the codec list in the SDP offer and a list of codecs for which the Target MGW can transcode based on the codec list in the SDP offer; and sending a reliable non-failure SIP response message to the Anchor MSCe where the reliable non-failure SIP response message contains a SDP answer to the SDP offer.

19. The method of claim 18, wherein the Session Initiation Protocol (SIP) INVITE message does not contain a Session Description Protocol (SDP), and wherein the TIA/EIA-41 FacilitiesDirective2 INVOKE message comprises a list of candidate cells, an identity of the Target BS, and a codec the MS is presently using.

20. The method of claim 18, wherein the SIP Provisional Response further comprises (1) a SDP offer and (2) a full list of codecs that can be supported by the target MGW for the intersystem handoff of the MS.

* * * * *